United States Patent
Graf

(10) Patent No.: US 12,512,355 B2
(45) Date of Patent: Dec. 30, 2025

(54) MOTION SYSTEM WITH A CONFIGURABLE FEEDFORWARD CONTROL

(71) Applicant: ETEL S.A., Môtiers (CH)

(72) Inventor: Basile Renaud Graf, Neuchâtel (CH)

(73) Assignee: ETEL S.A., Môtiers (CH)

( * ) Notice: Subject to any disclaimer, the term of this patent is extended or adjusted under 35 U.S.C. 154(b) by 282 days.

(21) Appl. No.: 18/529,016

(22) Filed: Dec. 5, 2023

(65) Prior Publication Data

US 2024/0194512 A1 Jun. 13, 2024

(30) Foreign Application Priority Data

Dec. 9, 2022 (EP) .................... 22212450

(51) Int. Cl.
*H01L 21/68* (2006.01)
*F16F 15/00* (2006.01)

(52) U.S. Cl.
CPC ............ *H01L 21/68* (2013.01); *F16F 15/002* (2013.01)

(58) Field of Classification Search
CPC ....... H01L 21/68; F16F 15/002; F16F 15/027; F16F 15/021; G05B 2219/49048;
(Continued)

(56) References Cited

U.S. PATENT DOCUMENTS

| | | |
|---|---|---|
| 5,172,160 A | 12/1992 | Van Eijk |
| 6,021,991 A | 2/2000 | Mayama |
| 6,590,639 B1 * | 7/2003 | Yuan ................... G03F 7/70825 |
| | | 355/75 |

FOREIGN PATENT DOCUMENTS

| | | |
|---|---|---|
| EP | 0502578 A1 | 9/1992 |
| EP | 1803969 B1 | 8/2016 |

OTHER PUBLICATIONS

Anderson, E. et al., "Active vibration isolation using adaptive feedforward control" Proceedings of the American Control Conference (Jun. 1997) pp. 1783-1788, vol. 00, XP093056805.
(Continued)

*Primary Examiner* — David Luo
(74) *Attorney, Agent, or Firm* — Carter, DeLuca & Farrell LLP

(57) ABSTRACT

A motion system includes a motion hardware system and a motion control system configured to control the movement of the motion hardware system. The hardware system includes a motion stage, a platform supporting the motion stage, and a machine frame resting on a ground surface. The platform includes a base and an active vibration isolation system arranged between the base and the machine frame. The active vibration isolation system includes actuators to provide together at least three degrees-of-freedom actuation of the base. The motion control system includes a feedforward control having a vibration isolation system controller for controlling the at least three DOF actuation of the active vibration isolation system to compensate, by exerting a counteracting force on the base, for expected reactions forces exerted by the motion stage on the base when operating. The feedforward control includes a memory for storing a string of characters defining the motion equations based on the topology of the motion stage, and a processing unit for processing the string of characters to compute the counteracting force.

20 Claims, 2 Drawing Sheets

(58) Field of Classification Search
CPC ........ G05B 2219/50176; G05B 19/404; G05B 13/042; G05D 19/02
USPC ................................................. 318/611, 560
See application file for complete search history.

(56) References Cited

OTHER PUBLICATIONS

European Search Report issued in corresponding EP Patent Application No. 22212450 dated Jun. 26, 2023, pp. 1-2.

* cited by examiner

MOTION SYSTEM WITH A CONFIGURABLE FEEDFORWARD CONTROL

CROSS-REFERENCE TO RELATED APPLICATIONS

The present application claims priority to Application No. 22212450.5, filed in the European Patent Office on Dec. 9, 2022, which is expressly incorporated herein in its entirety by reference thereto.

FIELD OF THE INVENTION

The present invention relates to a motion system with a reconfigurable feedforward control. The motion system includes, for example, a motion stage for imparting movements to equipment, e.g., a semiconductor processing equipment. The motion stage is mounted on a base resting on an active vibration isolation system. The active vibration isolation system is controlled by the configurable feedforward control to compensate for expected reactions forces exerted by the motion stage on the base when operating.

BACKGROUND INFORMATION

Precision motion systems, e.g., semiconductor processing equipment, such as positioning devices, coordinate measuring machines, or robots, include so-called active isolation systems, such as those described in U.S. Pat. No. 6,021,991, for isolating precision motion systems from ground vibration. Active isolation systems typically include several active bearings that are assembled between a granite base onto which the precision motion system can be mounted and a machine frame that rests on the floor. Active isolation systems therefore ensure the operation of precision motion systems with as little parasitic movement as possible, as a result of which a high positioning or measurement accuracy is obtained.

Feedforward control may be utilized to compensate for reaction forces generated by precision motion systems. This compensation scheme uses known stage motions to compute forces and torques to be applied by the actuators to the base to compensate for reaction forces and thus avoid unwanted base motions.

European Patent Document No. 0 502 578 describes an example implementation of a feedforward control in an optical lithographic device with a lens system fastened to a machine frame of the device. The optical lithographic device includes a motion stage which is situated below the lens system and by which an object table is displaceable relative to the lens system over a guide surface of a support member coupled to the motion stage. The optical lithographic device is provided with a force actuator system fastened to a reference frame of the device and is controlled by a feedforward control. The force actuator system exerts, during operation, a compensatory force on the machine frame with a direction which is opposed to a direction of a reaction force exerted simultaneously on the support member by the motion stage, and with a value that is substantially equal to a value of the reaction force. The device also includes a feedback damping system to prevent movements of the machine frame caused by forces other than the driving forces exerted by the positioning device on the object table, such as seismic forces transmitted from the ground onto which the optical lithographic device is mounted.

European Patent Document No. 1 803 969 describes another motion system including a motion stage, a feedforward control, and a feedback damping system. The feedforward control includes a control unit adapted for compensating the impact of inertial forces generated by a motion stage. The control unit includes a memory that contains transfer functions of the moving parts of the motion stage to appropriately filter the quasi-continuous forces to take the motion stage dynamics into account, and a model of the forces that can suddenly occur.

The feedforward control of the motion system described above has the inconvenience of being dependent on the specific topology of the motion stage degrees of freedom. In this respect, European Patent Document No. 0 502 578 describes a motion stage capable of moving in X and Y directions in a plane, and requiring compensation of in-plane reaction forces, whereas European Patent Document No. 1 803 969 describes a motion stage with only one degree of freedom. There is however a great variety of motion stage topologies with different types and numbers of degrees of freedom. The computation of the counteracting forces to be compensated based on the motion stage movements is performed inside the feedforward control, using motion equations. These must be adapted for each type of motion stage topology to compute the counteracting forces.

This computation of counteracting forces based on motion stage topology implies programming and compilation of programing languages that cannot be done on site. In the event of a change in motion stage topology during a development phase, a new program for the feedforward control would therefore need to be compiled, which is cumbersome and slow. In addition, to support different motion stage topologies, the motion system would need to store a library of different programs to execute motion equations corresponding to each topology, whereby none of these programs can be removed from the library to avoid interfering with backward compatibility. Over time, maintaining a library with many obsolete entries can become a serious burden and incur significant costs.

SUMMARY

Example embodiments of the present invention provide a motion system with a feedforward control that can be adapted to the specific topology of a motion stage.

Example embodiments of the present invention provide a motion system that can be adapted for any new motion stage topology directly on-site.

According to example embodiments of the present invention, a motion system includes a hardware system and a motion control system configured to control the movement of the hardware system. The hardware system includes a motion stage, a platform supporting the motion stage, and a machine frame resting on a ground surface. The platform includes a base and an active vibration isolation system arranged between the base and the machine frame. The active vibration isolation system includes actuators to provide together at least three degrees-of-freedom (DOF) actuation of the base. The motion control system includes a feedforward control having a vibration isolation system controller for controlling the at least three DOF actuation of the active vibration isolation system to compensate, by exerting a counteracting force on the base, for expected reactions forces exerted by the motion stage on the base when operating. The feedforward control includes a memory for storing a string of characters inputted by an operator and defining the motion equations based on the topology of the motion stage, and a processing unit for processing the string of characters to compute the counteracting force.

According to example embodiments, the motion control system further includes at least one position controller configured to acquire position and acceleration of a motion axis of the motion stage, a master controller, and a digital bus. The master controller is configured to receive and process data relative to the position and acceleration of the motion axis of the motion stage corresponding to the motion equations. The digital bus connects the position controller to the master controller and the latter to the active vibration isolation system controller. The master controller is configured to compute in real-time the counteracting forces based on the string of characters and to send the computed counteracting forces to the active vibration isolation system controller.

According to example embodiments, the master controller is configured to provide a user interface to edit the stored string of characters.

According to example embodiments, the user interface is connected to the master controller through a wired or wireless network.

According to example embodiments, the user interface includes a computer, a portable computer, a tablet, a smartphone, and/or a touch screen.

According to example embodiments, the motion system further includes another memory, for example a hard drive, for storing predetermined strings of characters defining the motion equations of the motion stage corresponding to different topologies of the motion stage, which can be selected using a dedicated software.

According to example embodiments, the string of characters includes mathematical expressions for equations in the following form:

$$F = f(\vec{x}, \vec{\ddot{x}}, \vec{p})$$

in which $F=(F_x, F_y, F_z, T_x, T_y, T_z)^T$ represents the vector of the counteracting forces in at least three DOF, $\vec{x}$, $\vec{\ddot{x}}$ represents the vectors of respectively motion stage axes positions, and accelerations, $\vec{p}$ represents a vector of tunable parameters, and $f$ represents a function defining the motion equations for the given motion stage topology.

According to example embodiments, tunable parameters include items representing a mass, a dimension, an angular momentum, and/or an inertia.

According to example embodiments, the motion control system is configured to provide a user interface to edit the values of the tunable parameters.

According to example embodiments, the motion system further includes sensors in the active vibration isolation system to provide together three or six DOF measurements of the motions of the base, and a damping controller for controlling the three or six DOF actuator of the active vibration isolation system based on the sensors' outputs to dampen any vibrations caused for example by seismic forces transmitted from the ground surface.

According to example embodiments, the tuning of the vector of tunable parameters $\vec{p}$ is performed by executing a grid search tuning by varying one or more items of the vector of tunable parameters to find a set of parameters allowing for reducing an energy of an output signal generated by the damping controller.

According to example embodiments, the tuning of the vector of the tunable parameters $\vec{p}$ is performed by software by executing a model-based sensitivity analysis tuning of the vector of tunable parameters based on derivatives of the motion equations allowing for reducing an energy of an output signal generated by the damping controller.

Further features and aspects of example embodiments of the present invention are described in more detail below with reference to the appended schematic Figures.

DETAILED DESCRIPTION

Figure 1:
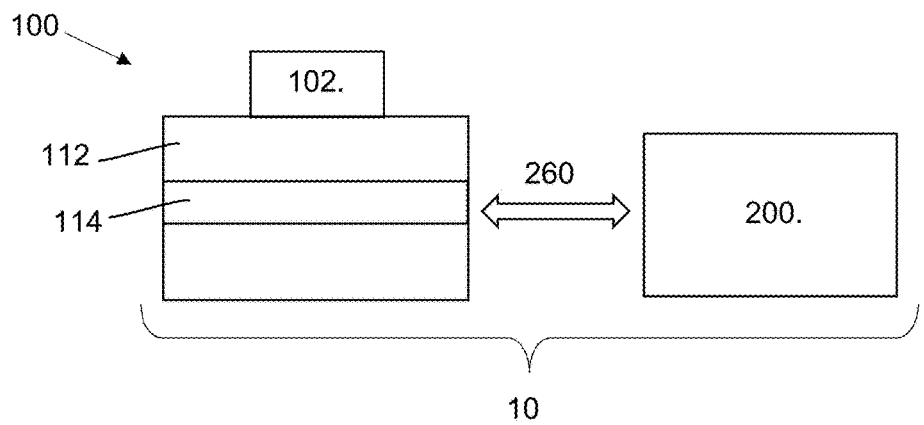
FIG. 1 illustrates a motion system that includes a motion hardware system and a motion control system adapted to control the hardware system as a function of the expected movements of the motion stage.

Referring to FIG. 1, the motion system 10 includes a motion hardware system 100 and a motion control system 200 configured to control the motion stage 102 of the hardware system 100 and to compensate for the expected reactions forces exerted by the motion stage 102 on the base 112 by controlling through a digital bus 260 an active vibration isolation system 114.

Figure 2:
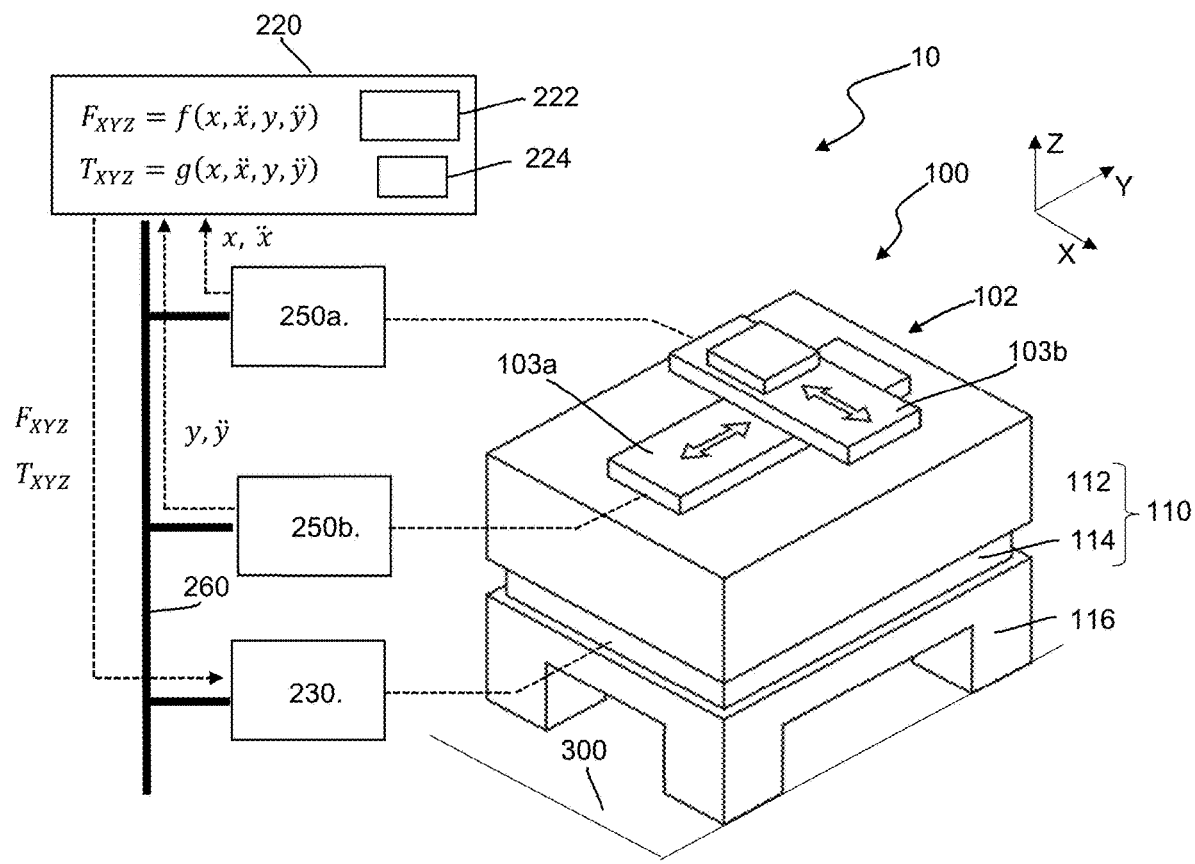
FIG. 2 illustrates the motion system illustrated in FIG. 1, including a motion stage of a first topology.

Referring to FIG. 2, the motion hardware system 100 includes a motion stage 102 of a specific topology, a support assembly 110 supporting the motion stage 102, and a machine frame 116 holding the support assembly 110 and resting on a ground surface 300. The support assembly 110 includes the base 112, for example, a granite slab, and the active vibration isolation system 114 mounted between the base 112 and the machine frame 116.

A stationary part of the motion stage 102 is fixed to the base 112. The active vibration isolation system 114 includes actuators to provide together at least three degrees-of-freedom (DOF) actuation of the base 112. As illustrated in FIG. 2, the motion stage 102 includes a first and a second linear motion axes 103a, 103b arranged to move their carriage along to two orthogonal axes x, y in the coordinate system x, y, z. As illustrated in FIG. 2, the second linear motion axis 103b is stacked on the first linear motion axis 103a, by being attached to the carriage of the first linear motion axis 103a. Therefore, when a motion is performed with the first linear motion axis 103a, the moving mass is the sum of the mass of the carriage of the first linear motion axis 103a and the total mass of the second linear motion axis 103b. The motion equations must take this into account to compute the counteracting forces. If the topology was inverted, with the first linear motion axis 103a being stacked on the second linear motion axis 103b, it would require different motion equations corresponding to this topology.

Figure 3:
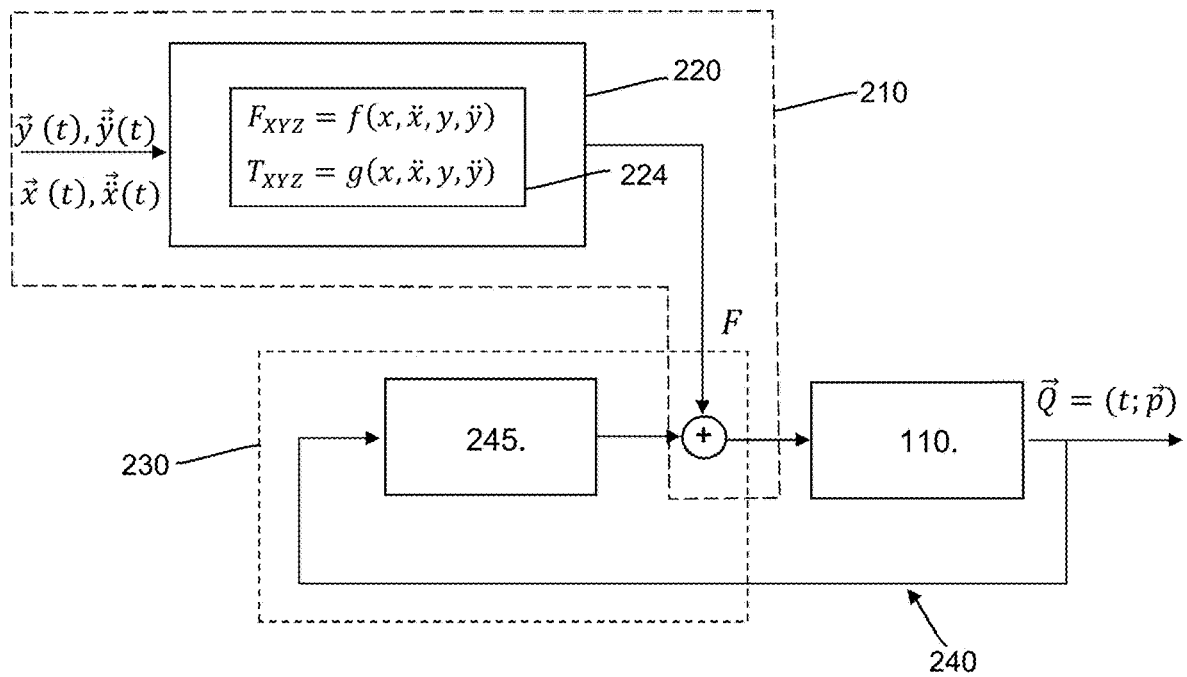
FIG. 3 illustrates a feedforward control and a feedback damping system of the motion control system illustrated in FIG. 2.

Referring to FIG. 3, the motion control system includes a feedforward control 210 having a vibration isolation system controller 230 for controlling the at least three DOF actuation of the active vibration isolation system 114 to compensate, by exerting a counteracting force F on the base 112, for expected reactions forces exerted by the movement of the first and second linear motion axis 103a, 103b of the motion stage 102 on the base 112 when the motion stage 102 is under operation to move equipment, e.g., semiconductor processing equipment, to a specific position, thereby providing an accurate positioning system insensitive to the reaction forces generated by the motion stage on the base.

The feedforward control 210 includes a memory 224 for storing a string of characters defining the motion equations based on the topology of the motion stage 102, and a processing unit 222 for processing the string of characters to compute the counteracting force vector F.

For example, the string of characters determining the counteracting force vector F does not need to be provided in a particular programming language as it does not need to be compiled prior to its use. This feature allows a significant level of flexibility regarding the topologies of the motion stage.

For example, a user may provide a text file containing the string of characters to be interpreted by the processing unit 222 to compute the counteracting force F.

A user may use a graphical programming language or graphical system modelling to generate the string of characters to be interpreted by the processing unit 222 to compute the counteracting force F.

Referring again to FIG. 2, the motion control system includes a first and a second position controller 250a, 250b of the motion stage 102. The second position controller 250b is configured to drive the first linear motion axis 103a along the y axis and to acquire position y and acceleration ÿ of the movements of its carriage to which the second linear motion axis 103b is attached. The first position controller 250a is configured to drive the second linear motion axis 103b along the x axis and to acquire position x and acceleration ẍ of the movements of its carriage. The motion control system 200 further includes a master controller 220 and a digital bus 260 connecting the first and second position controllers 250a, 250b to the master controller 220 and the master controller 220 to the active vibration isolation system controller 230.

The master controller 220 is configured to receive and process data relative to the position x, y and acceleration ẍ, ÿx of the first and second linear motion axes 103a, 103b of the motion stage 102 when operating using the digital bus 260 as a transmission device and according to the string of characters to compute the counteracting force vector F. The computational power of the master controller 220 allows the interpretation of the string of characters to derive mathematical expressions and a sequence of mathematical operations every time the string of characters is modified by the user. The computational power of the master controller 220 also allows the computation of the counteracting force vector F in near real-time using the sequence of mathematical operations. The computed counteracting force vector F is transmitted to the active vibration isolation system controller 230 using the digital bus 260 to control the actuators of the support assembly 110 of the motion hardware stage 100 to counteract the reactions forces generated by the motion stage.

For example, the master controller 220 includes a user interface allowing an operator to enter and/or edit the motion equations determining the counteracting force F. The user interface allows a user to enter strings of characters corresponding to the topology of the motion stage.

For example, the user interface may be integrated in the master controller or connected to the master controller via a wired network. Alternatively, the user interface may be connected to the master controller via a wireless network, allowing its use from a remote device.

The user interface may for example be a simple bus for data transfer, such as a USB port allowing the user to transfer a file containing the string of characters. Alternatively or complementarily, the user interface may provide for the user to directly enter (write) the string of characters into the master controller 220. The user interface may include a computer, a remotely connected computer, a tablet, a smartphone, or any other such type of electronic device allowing to share data with the master controller.

Each of the first and second position controllers 250a, 250b includes a delayed circuit to delay the signal, by a few milliseconds, for driving the first and second linear motion axes 103a, 103b of the motion stage 102 in order to take into consideration the computing time of the master controller and the digital bus latency. This ensures that actuators of the active vibration isolation system 114 are controlled by the active vibration isolation system controller 230 in synchronization with the reactions forces exerted by the motion stage 102 on the base 112.

For example, the active vibration isolation system 114 further includes inertial sensors, e.g., seismic sensors, to provide together three or six DOF measurements of the motions of the base 112. The support assembly includes a feedback damping system 240 transmitting measurements from the inertial sensors to a damping controller 245 for controlling, at each sampling period, the actuators of the active vibration isolation system 114 based on the inertial sensors' outputs to dampen any vibrations caused for example by seismic forces transmitted from the ground surface 300. The force vector output of damping controller 245 is added to the computed counteracting force F and used as force reference for the actuators that provide at least three degrees-of-freedom (DOF) actuation of the base 112. The motion system 10 can therefore counteract the reaction forces of the motion stage while being isolated from vibrations from the ground surface 300.

The string of characters may be retrieved from a configuration file which may include a configurable set of motion equations corresponding to different predefined motion stage topologies. This file may be downloaded in the memory 224 of the master controller 220.

The equations used by the master controller 220 to compute the counteracting force F can be expressed as $F=f(\vec{x}, \vec{\ddot{x}}, \vec{p})$, in which $F=(F_x, F_y, F_z, T_x, T_y, T_z)^T$ represents the vector of the counteracting forces in at least three DOF, $\vec{x}$, $\vec{\ddot{x}}$ represent the vectors of respectively motion stage axes positions and accelerations, $\vec{p}$ represents a vector of tunable parameters, and $f$ represents a function defining the motion equations for the given motion stage topology.

The motion equations are given in the form of at least three expressions for calculating, at each sampling period, the three forces $F_x$, $F_y$, $F_z$, and three torques $T_x$, $T_y$, $T_z$, for a 6DOF system to compensate for the motion stage reaction forces. The calculation of the forces uses Newton's second law of motion $F=m \cdot a$ and its counterpart for rotary motions. The expressions for the values of torque may include gravity compensation to maintain the base horizontal when the motion stage moves in the plane.

The vector of tunable parameters $\vec{p}$ includes items representing a mass, a dimension, such as a length, a width, a height, a diameter, an angular momentum, an inertia of the motion stage, etc. Any other relevant physical quantity for the determination of the counteracting force F can be included in the vector of tunable parameters.

The motion control system may provide a user interface to edit the values of these tunable parameters.

One or more parameters of the vector of tunable parameters $\vec{p}$ can be tuned using dedicated software to increase the performances of the control motion system. The string of characters can be provided to the software, allowing an evaluation of the equations determining the counteracting force which makes possible to perform parameter-tuning experiments.

For example, a grid search parameter tuning can be performed by the software so as to optimize one or more parameters simultaneously. Typically, a couple of parameters (p, p') of the vector of tunable parameters $\vec{p}$ are to be tuned simultaneously. For each pair of test parameters ($p_i$, $p_j'$), a stage motion of the motion stage is repeated. For each experiment, the motion of the base 112 is measured. A dimension reduction algorithm such as a PCA (Principal Component Analysis) can be used to define a cost function. The minimum of this cost function provides the best couple of parameters that can be used to compute the counteracting force F. The cost function can be defined as the energy of an output signal generated by the damping controller.

For example, a model-based sensitivity analysis tuning may be performed allowing a fast-converging tuning scheme. Model-based refers, for example, the analysis taking into account the particular motion equations corresponding to the topology of the motion stage and therefore the counteracting force to be applied. Referring to FIG. 3, the lower part including the damping controller 245 and the support assembly 110 can be approximated by a linear system. Moreover, the motion stage dynamics can usually be modelled with high accuracy as all components may be chosen and defined by a user. Therefore, the transfer function from the counteracting force F to the measurement output $\vec{Q}(t, \vec{p})$ can be modelled and simulated using dedicated software. The upper part, that is the feed-forward control 210 responsible for computing the counteracting force F, can be non-linear.

The model-based sensitivity analysis relies on an estimation of the variation of $\vec{Q}$ with respect to the parameters $p_i$ forming the vector of tunable parameters $\vec{p}$ around a given starting point. In other words, the partial derivatives of $\vec{Q}$ with respect to $\vec{p}$ are estimated around a measurement signal. Then, an update of the components of $\vec{p}$ are computed so as to reduce the cost function derived from the signal $\vec{Q}$. This method is based on the theory of online parameter tuning, optimal control, repetitive control, and iterative learning control.

Alternatively or complementarily, a delay tuning to compensate for communication-bus transmission time and/or various accumulated phase-delay within the whole control loop can be applied.

For example, this delay to be applied is considered as one additional parameter t for every motion stage axis. The sensitivity is defined as the variation of the output signal $\vec{Q}$ with respect to this parameter τ and can be estimated by finite differences using an additional measurement performed with a slightly different stage delay. This approach can be used in conjunction with both the described tuning techniques.

Figure 4:
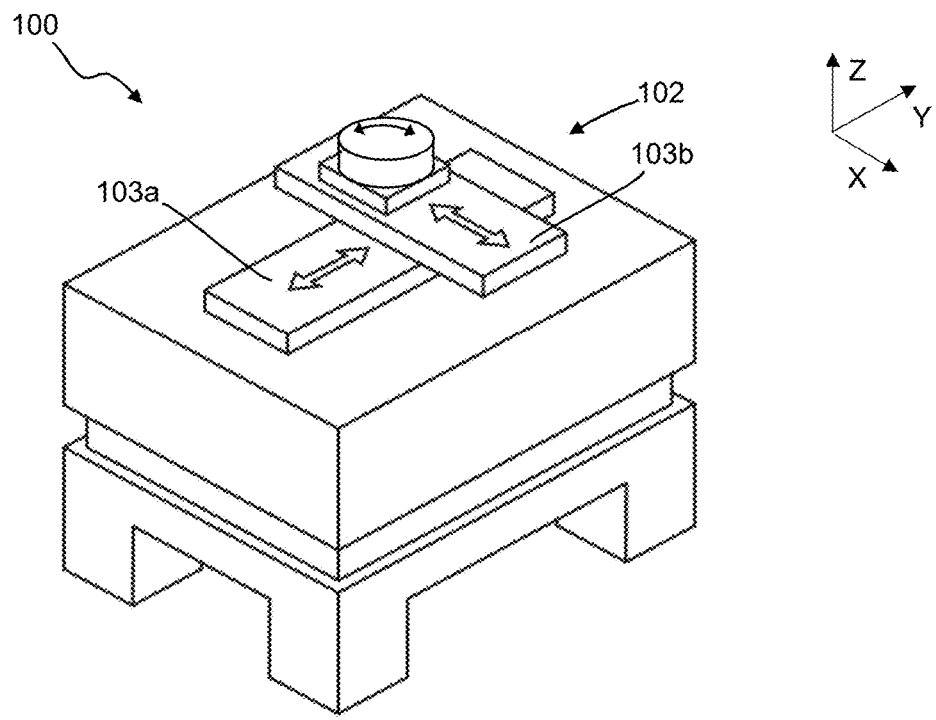
FIG. 4 illustrates a motion hardware system, similar to the hardware system illustrated in FIG. 2, including a motion stage with another topology.

FIG. 4 illustrates a motion hardware system 100 with a motion stage 102 with a different topology having three degrees-of-freedom, i.e., two orthogonal linear movements along the axes x, y and one rotational movement about the axis z. This level of flexibility in defining the motion equations allows for the compensation of the reaction forces of virtually any topology of motion stage mounted on the support assembly 110. The motion stage may be stacked linear and rotary systems, parallel kinematics systems, systems with arbitrary number of degrees-of-freedom, etc.

In more complex examples, the user may introduce intermediate temporary variables to reduce the overall number of operations. The above motion equations, which correspond to a rigid-body model of the motion stage, may be extended with some internal dynamics of input or output filters, thereby covering more detailed modelling of the motion stage and motion stage control.

LIST OF REFERENCE NUMERALS

10 Motion system
100 Motion hardware system
102 Motion stage
103*a*, 103*b* First and second linear motion axes
110 Support assembly
112 Base (e.g. granite slab)
114 Active vibration isolation system
116 Machine frame
200 Motion control system
210 Feedforward control
220 Master controller
222 Processing unit
224 Memory
230 Vibration isolation system controller
240 Feedback damping system
245 Damping controller
250*a*, 250*b* Position controllers
252 Delay timer
260 Digital bus
300 Ground surface

What is claimed is:

1. A motion system, comprising:
a motion hardware system including a motion stage, a support assembly supporting the motion stage, and a machine frame adapted to rest on a ground surface, the support assembly including a base and an active vibration isolation system arranged between the base and the machine frame, the active vibration isolation system including actuators adapted to provide at least three degrees-of-freedom (DOF) actuation of the base; and
a motion control system configured to control movement of the motion hardware system and including a feedforward control, the feedforward control including a vibration isolation system controller adapted to control the at least three DOF actuation of the active vibration isolation system to compensate, by exerting a counteracting force on the base, for expected reactions forces exerted by the motion stage on the base when operating;
wherein the feedforward control includes a memory adapted to store a string of characters defining motion equations based on a topology of the motion stage and a processing unit adapted to process the string of characters to compute the counteracting force.

2. The motion system according to claim 1, wherein the motion control system includes at least one position controller to acquire a position and an acceleration of a motion axis of the motion stage, a master controller adapted to receive and process data relative to the position and the acceleration of the motion axis of the motion stage corresponding to the motion equations, and a digital bus linking the position controller to the master controller and the master controller to the active vibration isolation system controller, the master controller being adapted to compute, in real-time, the counteracting force based on the string of characters and to send the computed counteracting forces to the active vibration isolation system controller.

3. The motion system according to claim 2, wherein the master controller is configured to provide a user interface to enter and/or edit the stored string of characters.

4. The motion system according to claim 3, wherein the user interface is connected to the master controller through a wired and/or wireless network.

5. The motion system according to claim 3, wherein the user interface includes a computer, a portable computer, a tablet, a smartphone, and/or a touch screen.

6. The motion system according to claim 3, wherein the user interface includes a graphical programming language and/or graphical system modeling adapted to generate the string of characters.

7. The motion system according to claim 2, further comprising another memory adapted to store predetermined strings of characters defining the motion equations of the motion stage corresponding to different topologies of the motion stage, the predetermined strings being selectable by dedicated software.

8. The motion system according to claim 1, wherein the string of characters includes mathematical expressions for equations in the following form:

$$F = f(\vec{x}, \ddot{\vec{x}}, \vec{p})$$

in which $F=(F_x, F_y, F_z, T_x, T_y, T_z)^T$ represents a vector of the counteracting forces in at least three DOF, $\vec{x}, \ddot{\vec{x}}$ represent vectors of respectively motion stage axes positions and accelerations, $\vec{p}$ represents a vector of tunable parameters, and $f$ represents a function defining the motion equations for a given motion stage topology.

9. The motion system according to claim 8, wherein the vector of tunable parameters includes components representing a mass, a dimension, an angular momentum, and/or an inertia.

10. The motion system according to claim 8, wherein the motion control system is configured to provide a user interface to edit values of the vector of tunable parameters.

11. The motion system according to claim 8, wherein the active vibration isolation system includes sensors adapted to provide together three or six DOF measurements of motions of the base, the motion system further comprising a feedback damping system including a damping controller adapted to control three or six DOF actuation of the active vibration isolation system based on outputs of the sensors to dampen vibrations caused by seismic forces transmitted the ground surface.

12. The motion system according to claim 11, wherein software of the motion system is adapted to perform the tuning of the vector of tunable parameters by executing a grid search tuning of the vector of tunable parameters to find a set of parameters allowing for reduction of energy of an output signal generated by the damping controller.

13. The motion system according to claim 11, wherein the motion system is adapted to perform the tuning of the vector of tunable parameters by executing a grid search tuning of the vector of tunable parameters to find a set of parameters allowing to reduce an energy of an output signal generated by the damping controller.

14. The motion system according to claim 11, wherein the motion system includes software adapted to perform the tuning of the vector of tunable parameters by executing a model-based sensitivity analysis tuning of the vector of tunable parameters based on derivatives of the motion equations allowing for reduction of energy of an output signal generated by the damping controller.

15. The motion system according to claim 11, wherein the motion system is adapted to perform the tuning of the vector of tunable parameters by executing a model-based sensitivity analysis tuning of the vector of tunable parameters based on derivatives of the motion equations allowing for reduction of energy of an output signal generated by the damping controller.

16. The motion system according to claim 1, wherein the memory is adapted to store the string of characters in a text file.

17. The motion system according to claim 1, wherein the base includes a granite slab.

18. The motion system according to claim 1, wherein the active vibration isolation system includes actuators adapted to provide at least DOF actuation of the base.

19. The motion system according to claim 18, wherein the actuators include linear actuators.

20. The motion system according to claim 19, wherein the motion control system includes a position controller corresponding to each actuator and adapted to drive the corresponding actuator along a respective linear axis.

\* \* \* \* \*